(12) United States Patent
Yang et al.

(10) Patent No.: US 8,212,940 B2
(45) Date of Patent: Jul. 3, 2012

(54) HYBRID ARCHITECTURE OF TV RECEIVING DEVICES

(76) Inventors: Dave Xiao Dong Yang, Beijing (CN);
Ling Chen, Fremont, CA (US);
Nien-Tsu Wang, Los Gatos, CA (US);
Hsi-Chen Wang, San Jose, CA (US);
Chih-Ching Steve Chou, San Jose, CA (US)

( * ) Notice: Subject to any disclaimer, the term of this patent is extended or adjusted under 35 U.S.C. 154(b) by 1410 days.

(21) Appl. No.: 11/567,211

(22) Filed: Dec. 6, 2006

(65) Prior Publication Data
US 2012/0086866 A1  Apr. 12, 2012

(51) Int. Cl.
*H04N 5/455* (2006.01)
*H04N 5/44* (2011.01)

(52) U.S. Cl. ........ 348/726; 348/725; 348/555; 348/552; 710/62; 710/300

(58) Field of Classification Search .......... 348/552–558, 348/441–458, 714, 716, 720, 731, 732, 733, 348/725, 726; 715/718, 5, 20; 712/33–36; 710/300, 301, 303, 62, 63, 72–74
See application file for complete search history.

(56) References Cited

U.S. PATENT DOCUMENTS

| | | | |
|---|---|---|---|
| 5,818,530 A * | 10/1998 | Canfield et al. ............ 348/400.1 |
| 6,850,252 B1 | 2/2005 | Hoffberg |
| 7,551,228 B2 * | 6/2009 | Lin et al. ........................ 348/552 |
| 7,813,822 B1 | 10/2010 | Hoffberg |
| 7,995,980 B2 * | 8/2011 | Lu .............................. 455/234.1 |
| 2003/0067555 A1 * | 4/2003 | Han .............................. 348/558 |
| 2006/0245720 A1 * | 11/2006 | Obara et al. .................... 386/46 |
| 2007/0010194 A1 * | 1/2007 | Lin .............................. 455/3.06 |

FOREIGN PATENT DOCUMENTS

CN 91105419.4 3/1992
CN 2005200654524 10/2006

\* cited by examiner

*Primary Examiner* — Michael Lee
(74) *Attorney, Agent, or Firm* — Wuxi Sino IP Agency, Ltd.; Joe Zheng

(57) ABSTRACT

A hybrid architecture of a television (TV) receiving system is disclosed. The architecture includes two portions, a hardware portion and a software portion. The hardware portion includes a minimum amount of hardware to achieve operations of receiving a RF signal, producing an IF signal and outputting data representing the IP signal. The software portion, taking advantage of available computing power (e.g., high-speed microprocessor and a lot of memory) in a computing device and executed therein, includes one or more demodulators, all implemented in software. Each of the demodulators is implemented in accordance with one type of TV standard. Thus depending on the received data, a corresponding demodulator is activated to demodulate the received data and subsequently produces audio and video data. One of the advantages, benefits and objects in the present invention is to have a band of software-based demodulators, any of which may be updated or expanded whenever there is a new TV standard or modification to an existing standard.

17 Claims, 3 Drawing Sheets

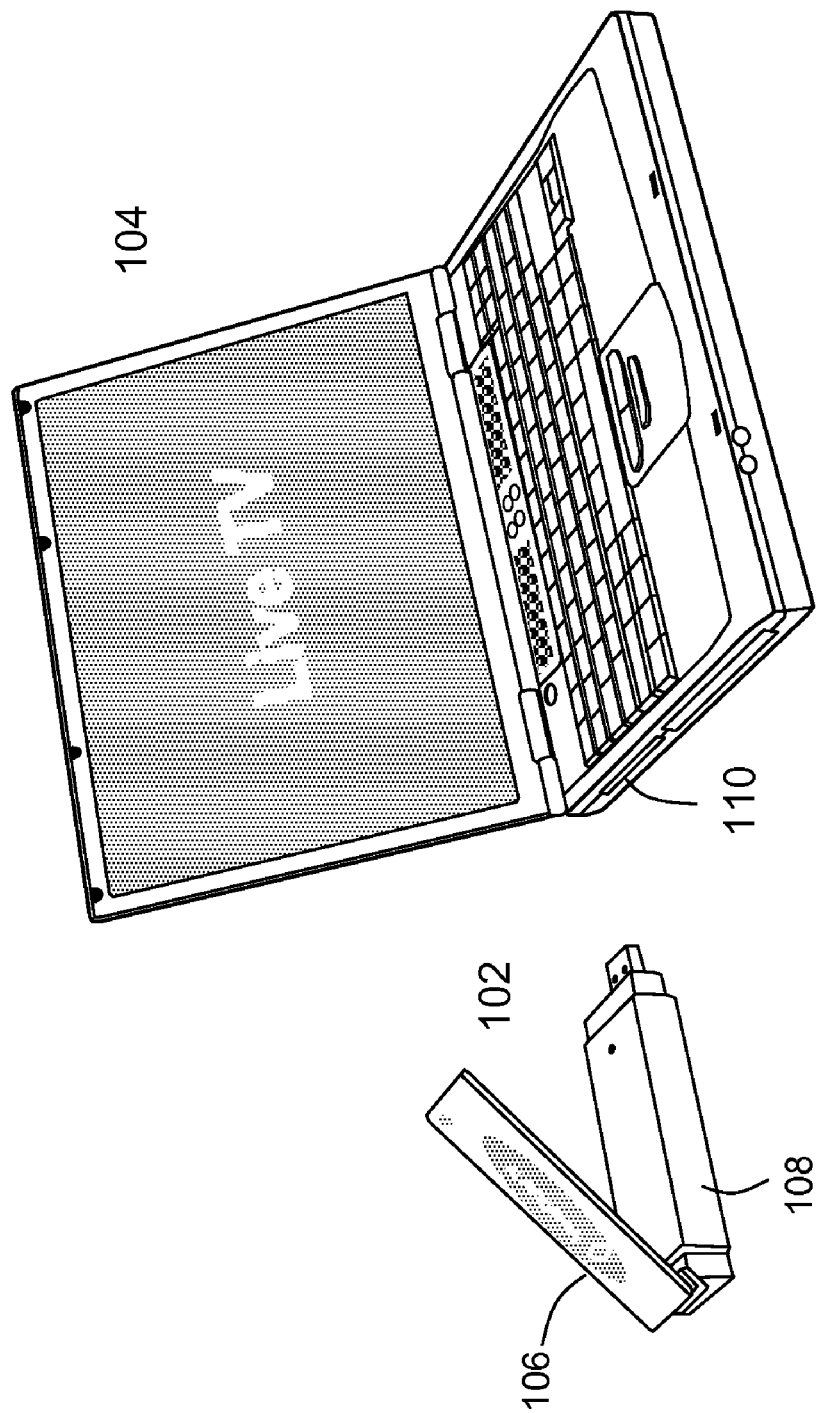

HYBRID ARCHITECTURE OF TV RECEIVING DEVICES

BACKGROUND OF THE INVENTION

1. Field of the Invention

The present invention is related to the area of television (TV) devices. More particularly, the present invention is related to hybrid architectures of TV receiving devices utilizing a minimum amount of hardware to facilitate the execution of software modules in a computing device so as to realize a TV receiver to receive both analog and digital TV on the computing device.

2. Description of Related Art

It is common to see people carrying a portable computer wherever they go. A portable computer allows a user to be connected from anywhere at anytime via the Internet. As computers are getting more and more powerful in terms of computing power (e.g., memory and processing speed), the expectation on a computer is beyond what a computer was originally designed for. With a powerful processor (e.g., Pentium) and an appropriate amount of RAM (e.g., 1 Gbytes), a computer can be used as an entertainment device, allowing a user to play a game alone or with others, download media files from somewhere and conference with anyone from anywhere.

A new trend is to make a computer perform like a TV receiver. Pinnacle Systems, Inc. of Mountain View, Calif. offers a device, called PCTV Pro USB, that allows a user to watch live TV on a computer whenever or wherever the user wants. The device, attachable to a computer, includes all necessary hardware and firmware to receive live TV signals and process the signals before the signals are presented on the computer screen via a USB port thereof.

In the TV arena, besides the traditional analog TV broadcasting that has been around for nearly 80 years, Digital Video Broadcasting (DVB) is being promoted. DVB is proposed to offer better reception and especially good for receivers on the go. Accordingly, devices that enable a computer to receive analog TV are being expanded to include more complicated hardware so that such devices are capable of receiving both analog and digital TV. However, similar to those devices designed only for receiving selected types of analog TV standards (e.g., NTSC, PAL or SECAM), these expanded devices are also labeled, for example, as DVB-T or ATSC, indicating they can receive digital TV in only selected standards but not all. In other words, a device for one type of digital TV (e.g., DVB-T) becomes unusable when the device is brought into an area being serviced with digital TV in ATSC. In reality, there are more standards in digital TV than that in analog TV. Although it is possible in theory to have a receiver capable of receiving digital TV in all standards, the current approach, primarily in baseband chip designs, would be too costly as the chip would have to include all circuits for all types of digital TV. Even such chips were ever designed, they would become obsolete immediately whenever a new digital TV standard is adopted.

There is, thus, a great need for a TV receiver that would never become obsolete and be readily updated whenever a new digital TV standard is adopted. Further such updating shall happen at a minimum cost and reception of a new TV standard is ready in seconds.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to a hybrid architecture of a television (TV) receiving system that is based on two portions, a hardware portion and a software portion. The hardware portion includes a minimum amount of hardware to achieve operations of receiving a RF signal, producing an IF signal and outputting data representing the IF signal. The software portion, taking advantage of available computing power (e.g., high-speed microprocessor and a lot of memory) in a computing device and executed therein, includes one or more demodulators, all implemented in software. Each of the demodulators is implemented in accordance with one type of TV standard. Thus depending on the received data, a corresponding demodulator is activated to demodulate the received data and subsequently produces audio and video data. One of the advantages, benefits and objects in the present invention is to have a bank of software-based demodulators any of which may be updated or that may be expanded whenever there is a new TV standard or modification to an existing standard.

The present invention may be implemented in various ways including an apparatus or a system. According to one embodiment, the present invention is a television (TV) receiving system that comprises: a converter receiving a RF signal and producing data representing an IF signal; and a module executing in a computing device to receive the data via a port, the module including at least one modulator configured to demodulate the data to produce a transport stream. In one embodiment, the converter includes: a RF tuner configured to receive the RF signal and producing the IF signal; an analog-to-digital converter (ADC), coupled to the RF tuner, receiving the IF signal and producing the data representing the IF signal; an automatic gain controller (AGC) provided to ensure that the IF signal is properly produced by the RF tuner; a port interface to be communicated with a corresponding port interface of the computing device; and a compression unit provided to receive the data and compress the data to a size that can be properly transported via the port interface.

One of the features, benefits and advantages in the present invention is to provide a TV receiving system that may be able to receive TV signals in all standards so that a user may receive live TV anywhere the user may go.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1 shows an exemplary configuration in which one embodiment of the present invention may be practiced;

DETAILED DESCRIPTION OF THE INVENTION

Figure 2A:
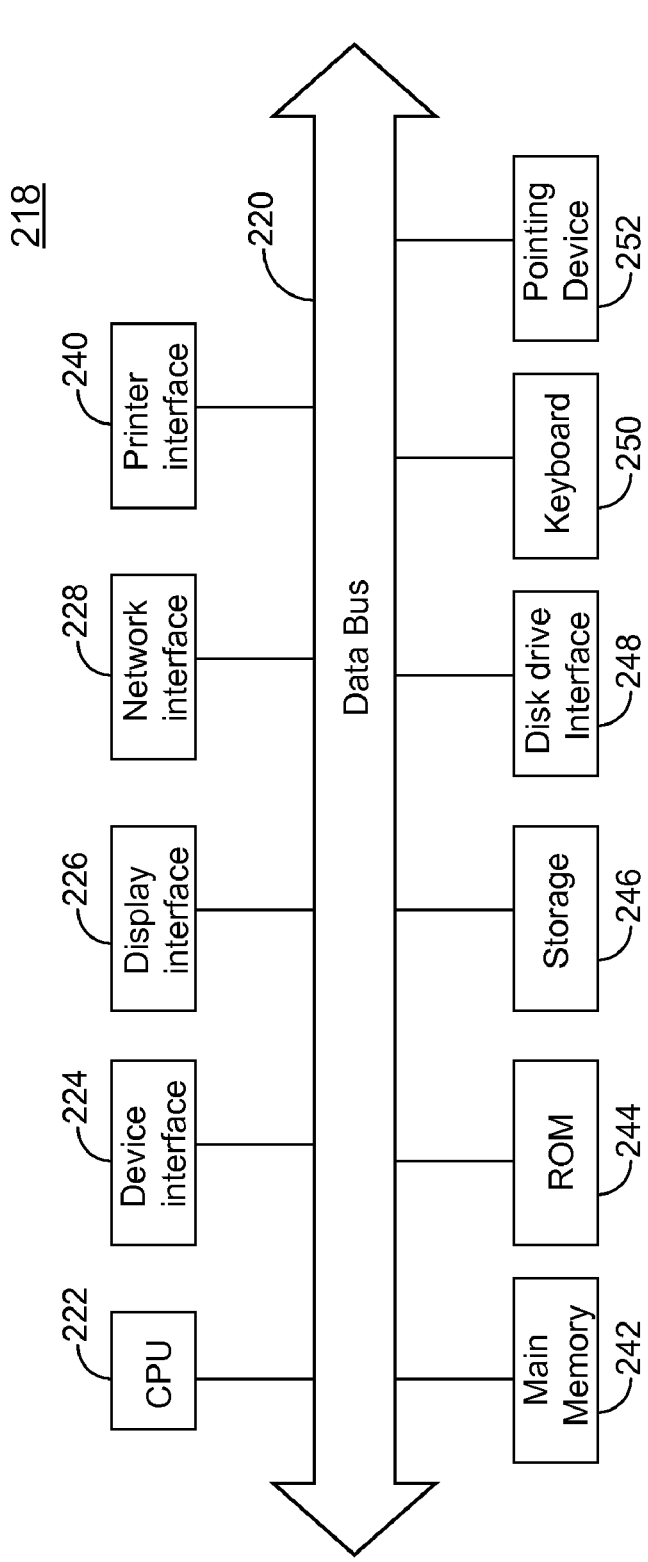
FIG. 2A shows exemplary internal construction blocks of a computing device that may correspond to the computer of FIG. 1.

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the invention are discussed below with reference to FIGS. 1-3. However, those skilled in the art will readily appreciate that the detailed description given herein with respect to these figures is for explanatory purposes as the invention extends beyond these limited embodiments.

FIG. 1 shows an exemplary configuration 100 in which one embodiment of the present invention may be practiced. The configuration 100 includes a dongle 102 and a laptop computer 104. The dongle 102 includes an antenna 106 and a housing 108. In one embodiment, the antenna 106 may be flipped up or down. In another embodiment, the antenna 106 may be externally and manually attached to the housing 108. According to one aspect of the present invention, a TV receiving system includes a hardware portion and a software portion. The hardware portion including corresponding firmware is included in the housing 108. The dongle 102 is designed to communicate with the computer 104 via a port 110. One example of the port 110 is a USB 2.0 port that allows data to be exchanged at a high speed between the dongle 102 and the computer 104. Accordingly, the dongle 102 is depicted like a USB driver that can be plugged into the port 110.

Those skilled in the art may appreciate that other types of ports are possible. For example, a dongle including similar hardware as those in the dongle 102 may be very well designed to include an SD (Secure Digital) interface. Many computing devices are also equipped with an SD interface. As a result, the dongle can readily communicate with a computing device when it is inserted into a corresponding interface of the computing device. It should be noted, unless specifically stated herein, the following description is based on a USB interface, yet there is no inherent limitation in the present invention as to exactly what interface it can be practiced with.

FIG. 2A shows exemplary internal construction blocks of a computing device 218 that may correspond to the computer 104 of FIG. 1. As shown in FIG. 2, the system 218 includes a central processing unit (CPU) 222 interfaced to a data bus 220 and a device interface 224. The CPU 222 executes certain instructions to manage all devices and interfaces coupled to data bus 220 for synchronized operations. The device interface 224 may be coupled to an external device such as another computing device. Also interfaced to the data bus 220 is a display interface 226, a network interface 228, a printer interface 240 and a disk drive interface 248. Generally, a compiled and linked version, an executable version, or a software module implementing one embodiment of the present invention is loaded into the storage space 246 through the disk drive interface 238, the network interface 228, the device interface 224 or other interfaces coupled to the data bus 220.

The main memory 242 such as random access memory (RAM) is also interfaced to the data bus 220 to provide the CPU 222 with the instructions and access to storage space 246 for data and other instructions, applications or services. In particular, when executing stored application program instructions, such as the software module of the present invention, the CPU 222 is caused to manipulate the data to achieve results contemplated by the present invention. The ROM (read only memory) 244 is provided for storing invariant instruction sequences such as a basic input/output operation system (BIOS) for operation of the keyboard 250, the display 226 and the pointing device 252, if there are any. In general, the system 218 is capable of communicating with a network and configured to exchange data with another computing device, or simply as an interface to receive data and instructions from a user.

It should be noted that, depending on application, a computing device used to realize one embodiment of the present invention, may not have each or all of the parts shown in FIG. 2A. It is understood to those skilled in the art that a computing device functions sufficiently with only some of the parts shown in FIG. 2A. According to one embodiment, the device interface 224 is a port (e.g., USB 2.0) that facilitates communication with an external device with a corresponding port. When the device interface 224 is engaged with an external device, the device interface 224 may provide a limited amount of power to energize the external device to operate.

According to one embodiment, when a dongle 102 of FIG. 1 is plugged into a port of the computer 104 of FIG. 1, the device interface 224 activates and starts to exchange data with the dongle 102. In the context of the present invention, the dongle 102, that may be powered additionally by an external power source if necessary, starts to receive TV signals. The computer 104, at the same time, is caused to receive data representing the TV signals and executes one or more software modules to process the data, and subsequently display the processed data on the display screen.

Figure 2B:
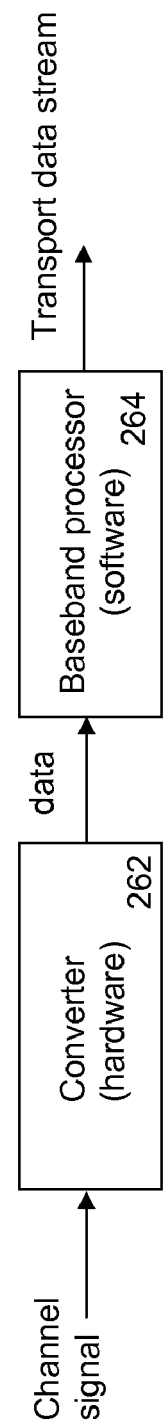
FIG. 2B shows a functional block diagram of a TV system based on the present invention.

FIG. 2B shows a functional block diagram 260 of a TV system based on the present invention. As described above, the system includes two portions, a hardware portion 262 and a software portion 264. The hardware portion 262 is also referred to as a converter designed to convert from a radio frequency (RF) signal to an intermediate frequency (IF) signal. Different from a prior art device, the output of the converter 262 is data or compressed data representing an IF signal. The data from the hardware portion 262 is coupled to the software portion 264 that is executed in a computing device. The software portion 264 may be configured to include one or more baseband processors. Upon receiving the data from the converter 262, an appropriate baseband processor is activated and processes the data to produce a transport data stream. The software portion 264 further includes an audio decoder and a video decoder, or an integrated audio/video decoder. Via a transport (TS) DeMux, an audio data stream and a video data stream are produced by the audio decoder and the video decoder, respectively. Depending on the computing device, the audio data stream and the video data stream may be coupled to speakers or a display screen or further processed in an audio module and a video processing module before the audio data stream and the video data stream are coupled to speakers or a display screen.

Figure 3:
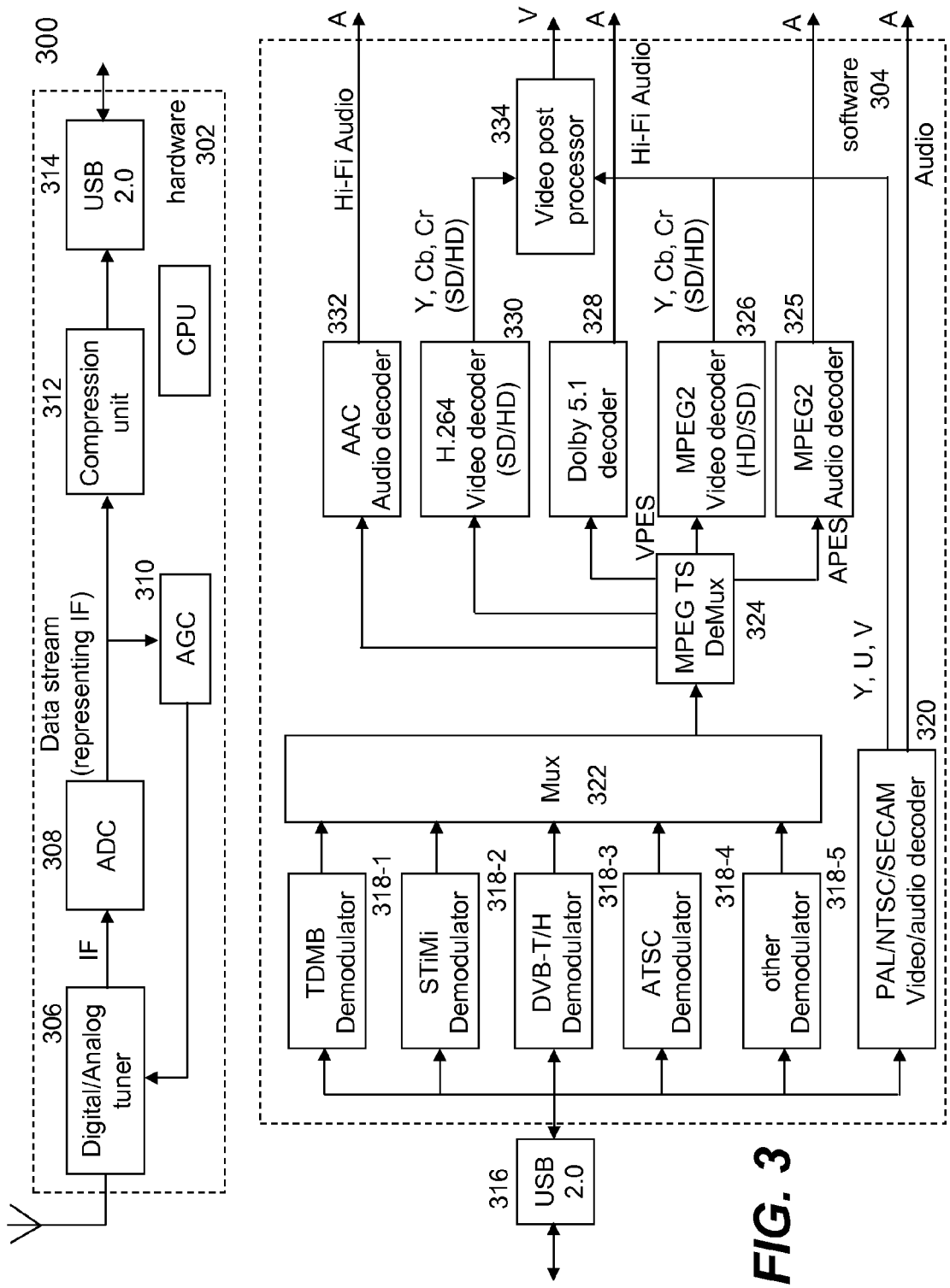
FIG. 3 shows a functional block diagram of a hybrid architecture of a TV receiving system according to one embodiment of the present invention.

FIG. 3 shows a functional block diagram of a hybrid architecture 300 of a TV receiving system according to one embodiment of the present invention. The architecture 300 includes two portions 302 and 304, one implemented in hardware and the other implemented in software. The hardware portion 302 is preferably enclosed in a case with a communication port (e.g., a USB2.0 port). The software portion 304 is loaded in a computer readable medium (e.g., a storage space) and to be executed when TV reception is desired.

The hardware portion 302 includes a RF tuner 306, an analog-to-digital converter (ADC) 308, an automatic gain controller (AGC) 310, a compression unit 312 and a USB 2.0 interface 314, some or all controlled by or operating with a microcontroller (e.g., a CPU). In one embodiment, the tuner 306 is designed to be able to receive both analog and digital TV signals. In another embodiment, the tuner 306 is an integrated tuner including two or more individual tuners, one for receiving the analog TV signals and the other one for receiving digital TV signals. It is assumed that the tuner 306 is tuned to a specified channel, the output from the tuner 306 is an intermediate frequency (IF) signal that is coupled to the ADC 308.

The IF signal is digitized by the ADC 308 (e.g., 10-bit or 12-bit). The data representing the IF signal from the ADC 308 is then coupled to the compression unit 312 that is designed to compress the data to a type of data that can be transmitted to a computing device at or close to a predefined rate. The AGC 310 is provided to adjust the IF signal (e.g., amplitude thereof) and provides a feedback adjusting signal to the tuner 306 so that the IF signal can be properly processed in the ADC 308 and there are less errors in the subsequent processing.

In one embodiment, to ensure that the data can be transmitted at a rate not exceeding a limit inherited in the USB 2.0 interface 314, the compression unit or compressor 312 is specifically designed to ensure that the output thereof possesses a constant bit rate or is not to exceed a predefined bit rate (e.g., 200 Mbps bounded by a speed limit of 480 Mbps in USB2.0). When a different port is used, the compressor 312 may have to include a different compression engine to ensure that the data can be safely transmitted through the port. In one embodiment, the compressor 312 is realized using a lossless compression algorithm. The data to be transported through the port representing an IF signal that carries important information to facilitate a corresponding baseband processor to function properly. Different from simply compressing video data, certain portions of the data have to be preserved in high fidelity. In another embodiment, the compressor 312 is realized using a lossy compression algorithm with modifications not to distort a particular portion of the data.

A corresponding USB interface 316 is provided on a computing device (e.g., 110 of FIG. 2). Once the USB interface 314 is engaged with the USB interface 316, the data (compressed) representing the IF signal is received in the computing device. The software module 304 being executed is configured to receive and process the data and, subsequently, output audio and video data.

As shown in FIG. 3, the software module 304 includes an array of demodulators, each configured for one digital TV standard. For illustration purpose, there are shown four specific demodulators 318-1, 318-2, 318-3 and 318-4. Not shown in FIG. 3, the software module 304 further includes a decompression engine as the software module 304 is receiving compressed data from the hardware module 302. The compressed data received from the USB interface 316 is decompressed before the data is coupled to a bank of demodulators.

The TDMB demodulator 318-1, designed in accordance with the South Korean terrestrial digital multimedia broadcasting standard, is configured to demodulate the received data representing digital TV signals in South Korea. STiMi is a China-developed technology standard for broadcasting television signals to mobile phones. Accordingly, the STiMi demodulator 318-2 is configured to demodulate the received data representing digital TV signals in China. DVB-T and DVB-H are two popular European terrestrial and handheld digital TV standards. The DVB-T/H demodulator 318-3, which may be implemented separately for DVB-T or DVB-H, is configured to demodulate the received data representing digital TV signals in Europe or other countries adopting the standard. ATSC stands for Advanced Television Systems Committee which is a group that developed the ATSC digital television standard for the United States, also being adopted by other countries. The ATSC demodulator 318-4 is configured to demodulate the received data representing the ATSC TV signals. It can be appreciated that any demodulators may be readily installed because all demodulators in accordance with the present invention are implemented in software. The demodulator 318-5 is a representation of a demodulator designed to demodulate a specified digital TV standard (e.g., MediaFLO being promoted by Qualcomm Inc. DMB being prompted by China, ISDB being promoted by Japan).

In one embodiment, only one of the demodulators is activated to process the received data by way of, for example, one or more indicator or flag in the data. For example, if the data coming from the hardware portion 302 is from a digital TV in STiMi, the demodulator 318-2 is activated. In another embodiment, as shown in FIG. 3, a multiplexer (Mux) 322 is provided to select an output from one of the demodulators 318-1, 318-2, 318-3, 318-4 and 318-5 and couples the output to a transport demultiplexer (TS DeMux) 324. One of the functions provided by the TS DeMux 324 is to separate audio and video data. As most of the current digital TV signals carry data compressed in MPEG (a designation for a group of coding and compression standards for audio and video). The TS DeMux 324 is also referred to as MPEG TS DeMux. The outputs from the TS DeMux 324 are essentially two compressed data streams, a compressed audio data stream and a compressed video data stream.

Depending on the compression used in the original digital TV signals, the two compressed data streams from the TS DeMux 324 need to be coupled to a pair of corresponding audio and video decoders. It is assumed that the original digital TV uses MPEG2. The audio and video data streams from the TS DeMux 324 are referred to, respectively, as an audio packetized element stream or APES and a video packetized element stream or VPES. The APES and VPES from the DeMux 324 may be coupled to MPEG2 audio decoder 325 and MPEG2 video decoder 326. If the original digital TV uses a compression standard other that MPEG2, the audio data stream from the TS DeMux 324 is coupled to a Dolby 5.1 audio decoder 328 or a specialized audio decoder 332 (e.g., Advanced Audio Coding or AAC audio decoder) while the video data stream from the DeMux 324 may be coupled to a specialized video decoder 330 (e.g, H.264 video decoder). The audio output from the audio decoder 328 or 332 is coupled to one or more speakers or sometimes a sound card for amplification, if there is one, in the computing device, where sound is reproduced.

As far as the video is concerned, there are at least two modes, standard definition (SD) and high definition (HD), the video decoder 326 or 328 can be designed to process either one of the definitions. Alternatively, a video decoder for SD and a video decoder for HD may be provided at the same time, which is useful when a picture-in-picture (PIP) feature in the display is desired.

Although digital TV broadcasting is a trend, the analog TV is not going away anytime soon. To accommodate the reception of the analog TV in PAL, NSTC or Secam, an analog video/audio decoder 320 is also included in the software module 304. The video/audio decoder 320 is provided to receive the data representing an analog TV signal from the USB port 316 and extract YUV. The YUV component signals are then coupled to the video post processor 334 in which various video enhancements, artistic effects and processing may be implemented. The output video signals from the video post processor 334 are coupled to a display screen associated with a computing device for display. The analog video/audio decoder 320 also produces an audio signal that may be coupled to speakers or via a sound card. As a result, the analog TV signal is reproduced.

The component signals YCbCr are then coupled to a video post processor 334 in which various video enhancement and processing may be implemented. The output video signals from the video post processor 334 are coupled to a display screen associated with a computing device for display. As a result, the digital TV signal is reproduced. One of the most important features, benefits and advantages is that all types of digital TV, regardless of its standard, could be received in a system implemented in accordance with the hybrid architecture 300 of FIG. 3. Those skilled in the art can understand that it would cost enormous if a dedicated baseband chip is to be designed to accommodate all types of digital TV standards. Moreover, the hybrid architecture 300 of FIG. 3 can be readily expanded to work with an additional digital TV standard if there is one or any modification of an existing standard, while a dedicated baseband chip would immediately become obsolete when there is a new one or any modification of an existing standard.

Although exemplary embodiments of the present invention have been disclosed in detail, it will be apparent to those skilled in the art that various changes and modifications may be made to achieve the advantage of the invention. It will be obvious to those skilled in the art that some components may be substituted with another component providing same function. Accordingly, the scope of the present invention is defined by the appended claims rather than the foregoing description of embodiments.

We claim:

1. A television (TV) receiving system comprising:
   a converter, included in a dongle attachable to the computing device, receiving a radio frequency (RF) signal and producing data representing an intermediate frequency (IF) signal, wherein the converter includes:
      a RF tuner configured to receive the RF signal and produce the IF signal;
      an analog-to-digital converter (ADC), coupled to the RF tuner, receiving the IF signal and producing the data representing the IF signal;
      an automatic gain controller (AGC) provided to ensure that the IF signal is properly produced by the RF tuner;
      a port interface to be communicated with a corresponding port interface of the computing device to transmit the data to the computing device;
      a compression unit provided to compress the data to satisfy a transmission rate determined by a protocol between the port interface and a corresponding port interface of the computing device; and
   a module being executed in a computing device to receive via a port thereof the data from the converter, the module including a plurality of demodulators, each of the demodulators corresponding to one TV standard, the module configured to activate a corresponding one of the demodulators according to characteristics of the IF signal pertaining to one TV standard and decompress and demodulate the data to produce an audio data stream and a video data stream with the corresponding one of the demodulators.

2. The system as claimed in claim 1, wherein the RF signal is one of a digital TV signal and an analog TV signal.

3. The system as claimed in claim 2, wherein the digital TV signal is in accordance with a standard.

4. The system as claimed in claim 3, wherein the standard is one of a TDMB, STiMi, DVB-T, DVB-H, ATSC, MediaFLO, DMB and ISDB.

5. The system as claimed in claim 1, wherein the port interface is a serial or parallel interface.

6. The system as claimed in claim 1, wherein the port interface is one of various versions of USB.

7. The system as claimed in claim 1, wherein a compression technique implemented in the compression unit is based on either a lossless compression technique or a lossy compression technique.

8. The system as claimed in claim 7, wherein the lossy compression technique is configured to ensure a certain portion of the data is always preserved in high fidelity.

9. The system as claimed in claim 8, wherein the module includes a decompression unit that is configured to decompress the compressed data received from the converter via the compression unit.

10. The system as claimed in claim 1, wherein the module further includes an audio and video (AV) decoder, the AV decoder is activated when the data detected indicates that the RF signal is an analog TV signal, the AV decoder is configured to separate the data into an audio stream and three video data streams.

11. The system as claimed in claim 1, wherein the module is readily expandable to include a new demodulator whenever there is a new TV standard, without changing the converter, a TV signal in accordance with the new TV standard is received and demodulated and enjoyed via the computing device.

12. The system as claimed in claim 1, wherein the demodulators are all implemented in software and executed in the computing device.

13. A television (TV) receiving system comprising:
   a hardware portion enclosed in a dongle, the hardware portion receiving a radio frequency (RF) signal and producing data representing an intermediate frequency (IF) signal, the dongle including a port for transporting the data out, wherein the hardware portion includes:
      a RF tuner configured to receive the RF signal and producing the IF signal;
      an analog-to-digital converter (ADC), coupled to the RF tuner, receiving the IF signal and producing the data representing the IF signal;
      an automatic gain controller (AGC) provided to ensure that the IF signal is properly produced by the RF tuner; and
      a compression unit provided to receive the data and compress the data to a size that is properly transported via the port; and
   a software module executing in a computing device to receive the data via a corresponding port of the computing device, the software module including a bank of demodulators, each configured in accordance with one TV signal standard, wherein, at any time, only one of the demodulators is activated per characteristics of one TV signal standard in the data to demodulate the data after decompressed to produce an audio data stream and a video data stream when the dongle is coupled to the computing device via the corresponding port of the computing device.

14. The system as claimed in claim 13, wherein the software module includes a decompression unit that is configured to decompress the data received from the corresponding port of the computing device.

15. The system as claimed in claim 13, wherein the software module further includes a post-processing module configured to process the video data stream so that various enhancements are added to the video data stream.

16. The system as claimed in claim 1, wherein the television (TV) receiving system is a portable device.

17. The system as claimed in claim 13, wherein the television (TV) receiving system is a portable device.

* * * * *